3,317,588
PROCESS OF PURIFYING CYCLOHEXYL - AMMONIUM - N - CYCLOHEXYLSULFAMATE CONTAMINATED WITH CYCLOHEXYLAMINE SULFATE
Vipin D. Shah, Waukegan, Ill., assignor to Abbott Laboratories, North Chicago, Ill., a corporation of Illinois
No Drawing. Filed June 1, 1964, Ser. No. 371,767
3 Claims. (Cl. 260—501)

This invention relates to the manufacture of cyclohexylsulfamic acid. More particularly, it relates to the manufacture of salts of cyclohexylsulfamic acid substantially free of cyclohexylamine sulfate.

In the past, various processes have been used and exploited for the manufacture of cyclohexylsulfamic acid and its salts. In most of these processes, the cyclohexylamine used as the starting material is reacted with a sulfonating agent. Among the sulfonating agents commonly used are sulfamic acid, chlorosulfonic acid, sulfur trioxide, and the like. Unfortunately, the reaction between sulfuric acid or its derivatives on the one hand, and cyclohexylamine on the other hand, produces a number of undesirable by-products, aside from the desired cyclohexylammonium N-cyclohexylsulfamate (hereinafter simply referred to as "double salt"). The latter, by simple hydrolysis, produces cyclohexylsulfamic acid or its salts. In spite of obtaining the "double salt" in very good yields, it still has to be purified and the various by-products have to be eliminated. Depending on the co-reactants of cyclohexylamine, one by-product may occur in larger amounts than the others.

The most economical reactants for producing the above "double salt" would be cyclohexylamine and sulfur trioxide. However, the reaction product obtained thereby is contaminated with larger amounts of cyclohexylamine sulfate than when other co-reactants, e.g. sulfamic acid, are used for making "double salt." Unfortunately, cyclohexylamine sulfate has physical characteristics similar to those of the "double salt" which makes the separation of the two very cumbersome, expensive, and impractical. While small amounts of cyclohexylamine sulfate can be eliminated from the "double salt" by fractional crystallization, more than about 2.1% thereof is economically unacceptable because of the difficulty and expense involved for its removal. The alkaline hydrolysis which converts the "double salt" into cyclohexylamine and an alkaline salt of cyclohexylsulfamic acid also hydrolyzes the cyclohexylamine sulfate, producing cyclohexylamine and the corresponding sulfate salt. The latter is equally difficult to remove from the cyclohexylsulfamate as is cyclohexylamine sulfate from "double salt." Thus, the cyclohexylamine sulfate produced as a by-product in the preparation of "double salt" creates additional contamination in the usual process of making cyclohexylsulfamate salts.

It is therefore an object of the present invention to produce "double salt" substantially free of cyclohexylamine sulfate. It is a particular object of the present invention to provide a new and improved process for the production of "double salt" free of cyclohexylamine sulfate when cyclohexylamine and sulfur trioxide are used as the co-reactants, since in such a process somewhat larger amounts of the cyclohexylamine sulfate are formed as by-product. It is a further object of the present invention to provide a method for the substantially complete removal of cyclohexylamine sulfate from a solution of "double salt" in cyclohexylamine. Other objects will be apparent from the following disclosure.

The objects of the present invention are accomplished by placing a mixture of "double salt" and cyclohexylamine sulfate in aqueous cyclohexylamine containing 60% to 90% by weight cyclohexylamine, the amount of aqueous cyclohexylamine used being 1.5–5.0 parts by weight per part of solids, slurrying the solution at a temperature of at least 60° C., and separating the undissolved cyclohexylamine sulfate from the substantially sulfate-free "double salt" solution at a temperature of at least 60° C.

In a simple embodiment, the process of the present invention is carried out by stirring a mixture of "double salt" and cyclohexylamine sulfate in a mixture of cyclohexylamine and water, said mixture containing between 10% and 40% by weight of water, at a temperature of above 60° C., preferably between 90° and 110° C., and filtering the hot solution. The amount of solvent mixture to be used should be at least 1.5 parts by weight of the solids to be separated, and preferably not above 3 parts by weight of solids, because with larger amounts of solids, the filtrate becomes too dilute, while no further benefit is obtained. The filtration temperature should be sufficiently high to prevent the relatively concentrated "double salt" solution from freezing out.

To better understand the process of the present invention, reference is made to the following examples which are added as illustrations only and are not meant to limit the invention in any respect.

Example 1

A mixture of 40 grams of "double salt" and 4 grams of cyclohexylamine sulfate (10% of "double salt" is dissolved in a mixture containing 60 grams of cyclohexylamine and 10 grams of water. The mixture is briefly heated to 96° C. and filtered. The filter cake is washed with 2 ml. of water. The following distribution of solids is obtained: in the cake, 3.5 grams of cyclohexylamine sulfate, and 0.049 gram of "double salt"; in the filtrate, 39.96 grams of "double salt" and 0.5 gram of cyclohexylamine sulfate (1.25% of "double salt").

In order to carry out a similar separation in cyclohexylamine alone, approximately 1180 grams of cyclohexylamine is needed.

Example 2

A mixture of 26.8 pounds of "double salt" and 9.6 pounds of cyclohexylamine sulfate (35% of "double salt") is slurried up in a mixture containing 39.2 pounds of cyclohexylamine and 14.4 pounds of water. The mixture is heated to 105° C. and filtered. The cake is washed with 4 pounds of water and the filtrate and filter cake are analyzed, showing the cake to contain 9.2 pounds of cyclohexylamine sulfate, and the filtrate to contain 26.8 pounds of "double salt" and 0.4 pound of cyclohexylamine sulfate (1.5% of "double salt").

For a similar separation in pure cyclohexylamine, approximately 490 pounds of cyclohexylamine will be needed.

From the above examples it will be seen that the new separation technique is extremely advantageous in many respects. Most of all, a considerable saving is made in the use of expensive solvents, e.g., the savings of cyclohexylamine made in Example 1 is 93% and amounts to 89% in Example 2. A further advantage is the more concentrated filtrate obtained from which, obviously, the separation of the desired "double salt" is much quicker and more economical.

The process of the present invention is particularly useful for "double salt" mixtures containing more than about 1% of cyclohexylamine sulfate and may be usefully employed for mixtures containing up to 40% cyclohexylamine sulfate. When the "double salt" contains a large percentage of cyclohexylamine sulfate, it is advisable to use a cyclohexylamine/water mixture containing only between 10% and 20% of water; conversely, when the solid mixture contains only little cyclohexylamine sulfate as the impurity, a more dilute aqueous cyclohexylamine mixture may be used. The amount of solvent needed for the separation depends somewhat upon the composition of solids, and the amount of solvent needed decreases as the concentration of cyclohexylamine sulfate increases in the solids.

Others may practice the invention in any of the numerous ways which will be suggested to one skilled in the art by the present disclosure. All such practice of the invention is considered a part hereof provided it falls within the scope of the appended claims.

I claim:

1. The process of purifying cyclohexylammonium-N-cyclohexylsulfamate contaminated with cyclohexylamine sulfate, consisting essentially in placing 1 part of said contamined cyclohexylammonium-N-cyclohexylsulfamate in 1.5–5.0 part by weight of aqueous cyclohexylamine containing 60% to 90% by weight cyclohexylamine, slurrying the mixture at a temperature of at least 60° C., and separating the undissolved cyclohexylamine sulfate from the substantially sulfate-free cyclohexylammonium-N-cyclohexylsulfamate solution at a temperature of at least 60° C.

2. The process of claim 1 wherein said slurrying and separating is carried out at a temperature of at least 90° C.

3. The process of claim 1 wherein said aqueous cyclohexylamine is used in an amount of from 1.5 to 2.5 parts by weight per part of solids.

References Cited by the Examiner

UNITED STATES PATENTS 3,277,161   10/1966   Sundberg et al. _____ 260—501

LORRAINE A. WEINBERGER, *Primary Examiner.*

M. WEBSTER, *Assistant Examiner.*